United States Patent
She et al.

(10) Patent No.: US 7,848,445 B2
(45) Date of Patent: Dec. 7, 2010

(54) MULTIANTENNA COMMUNICATION APPARATUS AND MULTIANTENNA COMMUNICATION SYSTEM

(75) Inventors: Xiaoming She, Beijing (CN); Jifeng Li, Kanagawa (JP)

(73) Assignee: Panasonic Corporation, Osaka (JP)

( * ) Notice: Subject to any disclaimer, the term of this patent is extended or adjusted under 35 U.S.C. 154(b) by 572 days.

(21) Appl. No.: 11/915,377

(22) PCT Filed: May 26, 2006

(86) PCT No.: PCT/JP2006/310487

§ 371 (c)(1),
(2), (4) Date: Nov. 23, 2007

(87) PCT Pub. No.: WO2006/126648

PCT Pub. Date: Nov. 30, 2006

(65) Prior Publication Data

US 2009/0225874 A1    Sep. 10, 2009

(30) Foreign Application Priority Data

May 26, 2005  (CN) ................... 2005 1 0073893

(51) Int. Cl.
 *H04B 7/02* (2006.01)
 *H04L 1/02* (2006.01)
(52) U.S. Cl. .............. 375/267; 375/260; 375/343; 375/347
(58) Field of Classification Search ............ 375/267, 375/343, 347, 260
See application file for complete search history.

(56) References Cited

U.S. PATENT DOCUMENTS

| 2002/0165626 | A1 | 11/2002 | Hammonds |
| 2005/0002325 | A1 | 1/2005 | Giannakis |
| 2005/0181737 | A1 | 8/2005 | Kobayashi |
| 2005/0265475 | A1* | 12/2005 | Sun et al. ............ 375/298 |

FOREIGN PATENT DOCUMENTS

| JP | 2004-304760 | 10/2004 |
| JP | 2004-364094 | 12/2004 |

OTHER PUBLICATIONS

International Search Report dated Jul. 31, 2006.
A. Nagate, et al., "MC-CDMA Hoshiki ni Okeru Channel Suiteiho ni Kansuru Ichi Kento," IEICE Technical Report, Feb. 2002, vol. 101, No. 677, pp. 179-186.

* cited by examiner

*Primary Examiner*—Curtis B Odom
(74) *Attorney, Agent, or Firm*—Dickinson Wright PLLC

(57) ABSTRACT

A multiantenna communication system comprises a determining part (116) that calculates correlation values each between the channel characteristics of the resource blocks in an STBC (Space Time Block Code) and determines a combination pattern exhibiting the highest correlation; a connection distributing part (103) that maps, into a time domain, a frequency domain and a spatial domain, the STBC encoded transport data in accordance with the combination pattern determined by the determining part; a plurality of transmission antennas (107) for transmitting respective signals associated therewith; a plurality of reception antennas (108) for receiving the signals transmitted from the transmission antennas; and a connection multiplexing part (113) that extracts the signals, which belong to the same STBC, from the signals mapped into the time domain, frequency domain and spatial domain in accordance with the combination pattern determined by the determining part, and then combines the data blocks.

8 Claims, 6 Drawing Sheets

PRIOR ART

MULTIANTENNA COMMUNICATION APPARATUS AND MULTIANTENNA COMMUNICATION SYSTEM

TECHNICAL FIELD

The present invention relates to a multiantenna communication apparatus. More particularly, the present invention relates to a time-space-frequency coding method in a MIMO-OFDM communication system.

Background Art

With the merge of a wireless network and the Internet, there is a growing demand for variety and quality of wireless communication services. To meet a demand for wireless multimedia and high transmission rate data transmission, it is necessary to develop a new wireless communication system. The MIMO technology in particular is attracting attention, and in a MIMO system, the transmitting side transmits signals using a plurality of antennas and the receiving side receives signals using a plurality of antennas.

Compared to a conventional single antenna transmission method, the MIMO technology can significantly improve channel capacity, and can thereby increase an information transmission rate. Studies in recent years show that, when there is the greater number of transmitting/receiving antennas used for a MIMO system, the information transmission rate becomes higher. Furthermore, the MIMO technology can use resources in the space domain almost limitlessly compared to the time domain, and can thereby realize what is difficult to be achieved by conventional technologies and constitutes a core technology of the next-generation wireless communication system.

In recent years, a new coding technology using space-time code (STC) in a multiantenna MIMO system is proposed. To be more specific, the coding technology using space-time code can be classified into coding methods based on STBC (Space Time Block Code), STTC (Space Time Trellis Code) and STTTC (Space Time Trellis Turbo Code) and soon. Furthermore, compared to the above other space-time codes, the configuration of a coder using STBC is simple, the corresponding decoding method is also simple, and therefore it is easy to apply STBC to a coder. For example, the Alamouti coding method using STBC is actually employed for 3GPP. FIG. 1 shows input and output of a coder using STBC.

The input of the coder using STBC (hereinafter, referred to as an "STBC coder") is vector $x^b$ and the output is vector $X^b$. Here, superscript b is the data sequence number before and after coding. The b-th pre-coding data sequence $x^b$ is the vector of following equation 1 and each element is a symbol after modulation.

[1]
$$[x_1^b, x_2^b, \ldots, x_m^b] \qquad \text{(Equation 1)}$$

The b-th output $X^b$ after coding is a $(n_T \times L)$ matrix where $n_T$ is the total number of transmitting antennas of the MIMO system. As shown in FIG. 1, the coder using STBC performs a linear conversion from x to X, matrix $X^b$ is outputted after coding, all elements in the first row of $X^b$ (1, :) are transmitted from the first antenna and all elements on the second row (2, :) are transmitted from the second antenna.

STBC is easily applicable compared to other space-time codes, so that, when STBC coding is performed, orthogonal STBC (OSTBC) can be obtained by setting a mapping relationship from x to X. The Alamouti coding is the simplest OSTBC coding method and so OSTBC satisfies following equation 2.

[2]
$$XX^H = aI \qquad \text{(Equation 2)}$$

Therefore, complicated non-linear maximum likelihood (ML) decoding can be realized using a simple linear method. For example, the OSTBC coding method as represented by following equation 3 is proposed where the number of transmitting antennas $n_T$ is 4 and coding rate R is ½ (L is 8).

[3]
$$x = [x_1, x_2, x_3, x_4] \rightarrow \qquad \text{(Equation 3)}$$
$$X = \begin{bmatrix} x_1 & -x_2 & -x_3 & -x_4 & x_1^* & -x_2^* & -x_3^* & -x_4^* \\ x_2 & x_1 & x_4 & -x_3 & x_2^* & x_1^* & x_4^* & -x_3^* \\ x_3 & -x_4 & x_1 & x_2 & x_3^* & -x_4^* & x_1^* & x_2^* \\ x_4 & x_3 & -x_2 & x_1 & x_4^* & x_3^* & -x_2^* & x_1^* \end{bmatrix}$$

In FIG. 1, data sequence $x^b$ (b is 1, 2, ...) inputted to the STBC coder is encoded using the above mapping method and is outputted as matrix $X^b$ (b is 1, 2, ...). As is clear from equation 3, output $X^b$ after coding is a two-dimensional signal where the horizontal axis direction is the time domain signal and the vertical axis direction is the space domain signal. The time domain signal of matrix $X^b$ is transmitted in the time domain and the space domain signal is transmitted in the space domain. That is, a row in matrix $X^b$ corresponds to an antenna and a column corresponds to a time. It is possible to substantially reduce the degree of complexity of decoding on the receiving side by employing OSTBC.

However, to obtain perfect orthogonality of OSTBC, it is necessary to satisfy $H_1^b = H_2^b = \ldots = H_L^b$, that is, it is necessary to keep the channel characteristics constant when matrix $X^b$ is transmitted. $H_j^b$ is the channel characteristics of the MIMO system when a signal on the j-th column (j is 1, 2, ..., L) of matrix $X^b$ is transmitted. $H_j^b$ is a matrix of $n_R \times n_T$, where $n_R$ is the number of receiving antennas and $n_T$ is the number of transmitting antennas. Usually, in a MIMO single carrier system, when channel variation is few, $H_1^b = H_2^b = \ldots = H_L^b$ can hold.

Although the above MIMO system and STBC coding method are limited to applications to narrow band communication or single carrier communication, a wideband high-speed communication system will be required in the future as the wireless communication system and so the OFDM technology will become a principal technology for realizing a wideband high-speed communication system. The principle of OFDM is that high-speed data for transmission is transmitted using a large number of orthogonal subcarriers and the data transmission rate of each subcarrier is relatively low. Compared to a normal FDM system, it is possible to improve the frequency use efficiency of the system by subjecting subcarriers in an OFDM system to orthogonal multiplexing. According to OFDM, an entire bandwidth is divided into a plurality of narrow subcarrier bands and so each subcarrier width is narrower than the interference width of the channel and fading becomes flat for the subcarriers. Therefore, compared to single carriers, OFDM is less susceptible to frequency selective fading.

Taking into account the above background, the scope of research on STBC coding in recent years is shifting from the MIMO single carrier to MIMO-OFDM. The biggest difference between MIMO-OFDM and the MIMO single carrier is that MIMO-OFDM performs encoding not only in the time domain and the space domain but also in the frequency domain. That is, STBC in MIMO-OFDM is a three-dimensional system including the space domain, time domain and frequency domain. The STBC coding method in the MIMO-OFDM system is roughly divided into the following two types.

(1) Coding Method Using Space-Time (ST) Code

This method directly applies the STBC coding method in the single carrier system to the MIMO-OFDM system and STBC encodes each subcarrier independently. That is, space domain signals of matrix $X^b$ which is the output after coding are transmitted in the space domain and time domain signals are transmitted in the time domain.

FIG. 2 shows a coding method using ST code in the MIMO-OFDM system. To be more specific, the horizontal axis is the time domain and the vertical axis is the frequency domain. Row sets $S_1, \ldots, Sn_T$ of matrix $X^b$ which are the outputs after coding of all coding targets, correspond to each antenna, that is, first row set $S_1$ corresponds to antenna 1 and $n_T$-th row set $Sn_T$ corresponds to antenna $n_T$. Each illustrated square (cell) is a resource block and resource blocks encircled by an ellipse indicate mapping positions of time domain signals in the time domain.

According to this method, STBC coding is performed on all subcarriers independently and coded data is mapped in the time domain and the space domain, respectively. That is, the space domain signals of data are transmitted in the space domain and the time domain signals are transmitted in the time domain.

(2) Coding Method Using Space-Frequency (SF) Code

This coding method differs from above coding method (1) in transmitting the time domain signals of output $X^b$ after coding in the frequency domain (not the time domain) of the MIMO-OFDM system. The coding method using SF code in the MIMO-OFDM system is shown in FIG. 3.

As shown in FIG. 3, features of the coding method using SF code in the MIMO-OFDM system include STBC encoding all OFDM symbols in the time domain independently, mapping the row signal of the same coding target in the space domain and the column signal in the time domain, respectively and transmitting the signal.

DISCLOSURE OF INVENTION

Problems to be Solved by the Invention

However, even if the STBC coding method using ST code or SF code are used in the MIMO-OFDM system, the resulting system performance has a certain degree of difference from a desired value. That is, although the same STBC channel characteristics can be assumed to be constant in the MIMO single carrier system, the same STBC channel characteristics are not constant all the time in the MIMO-OFDM system. To be more specific, according coding using ST code in the MIMO-OFDM system, one STBC extends over L OFDM symbols and the time length of one OFDM symbol is by far longer than the time length of one symbol in a normal single carrier system, and therefore the channel characteristics in the L OFDM symbols are not constant. In the same way, according to coding using SF code in the MIMO-OFDM system, one STBC also extends over L subcarriers, and therefore even if optimum frequency channels (subcarriers) is selected, it is not possible to guarantee that the channel characteristics of the L subcarriers are constant.

That is, according to the MIMO-OFDM system, when the same STBC channel characteristics change, there is a problem that a bad influence occurs on the orthogonality between STBC's and intra-code interference deteriorates the performance of the system.

It is an object of the present invention to provide a multi-antenna communication apparatus which improves orthogonality between STBC's and improves system performance in a MIMO-OFDM system.

Means for Solving the Problem

The present invention adopts a configuration including: a determining section that calculates correlation values between channel characteristics of resource blocks in space time block code and determines a combination pattern of a greatest correlation; a distributing section that maps transmission data encoded using space time block code to a time domain, a space domain and a frequency domain according to the combination pattern determined by the determining section; a transmitting section that transmits, through a plurality of antennas, signals corresponding respectively to the antennas; a receiving section that receives, through a plurality of antennas, the signals transmitted by the transmitting section; and a multiplexing section that extracts signals corresponding to a same space time block code from the signals mapped to the time domain, the space domain and the frequency domain, according to the combination pattern determined by the determining section and forms a data block.

Advantageous Effect Of The Invention

According to the present invention, an STBC encoded time domain signal in a MIMO-OFDM system is mapped to a combination of resource blocks mutually having a great correlation between the channel characteristics and is transmitted, and interference due to variations of STBC channel characteristics is suppressed, so that it is possible to improve the orthogonality between STBC's and improve the transmission rate and the amount of throughput.

BEST MODE FOR CARRYING OUT THE INVENTION

Hereinafter, an embodiment of the present invention will be explained in detail with reference to the attached drawings.

Embodiment

Figure 1:
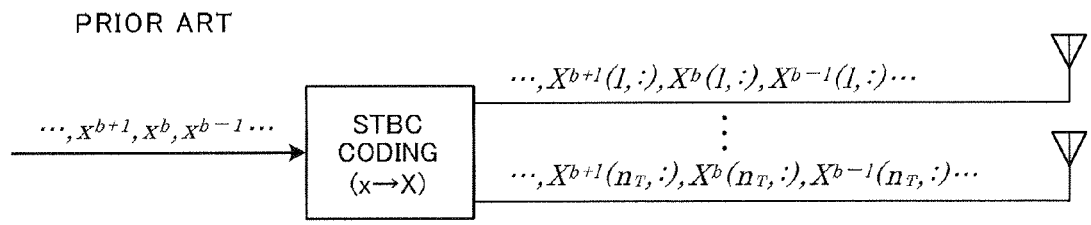
FIG. 1 shows input and output of a coder using STBC.
Figure 2:
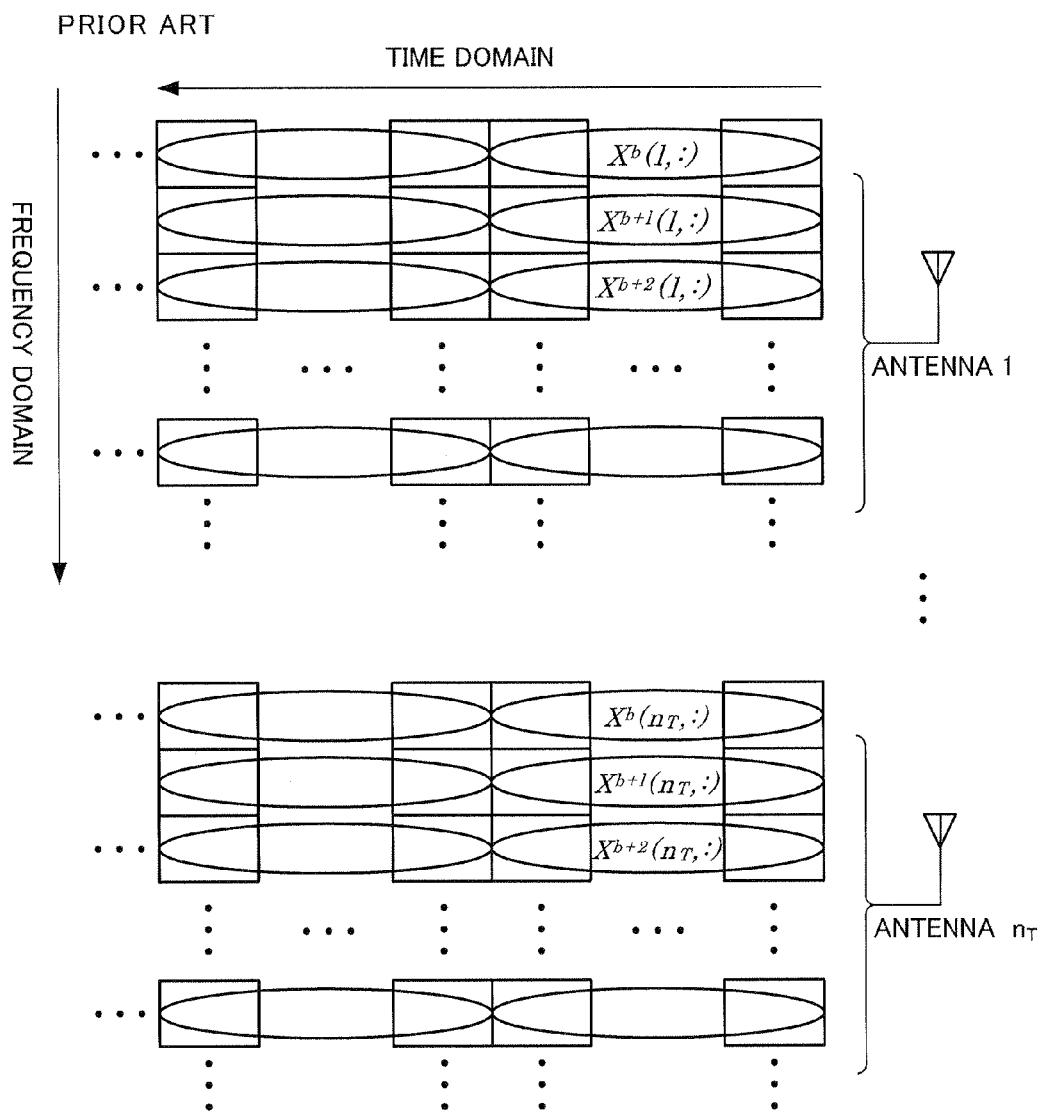
FIG. 2 shows an ST coding method in a MIMO-OFDM system.
Figure 3:
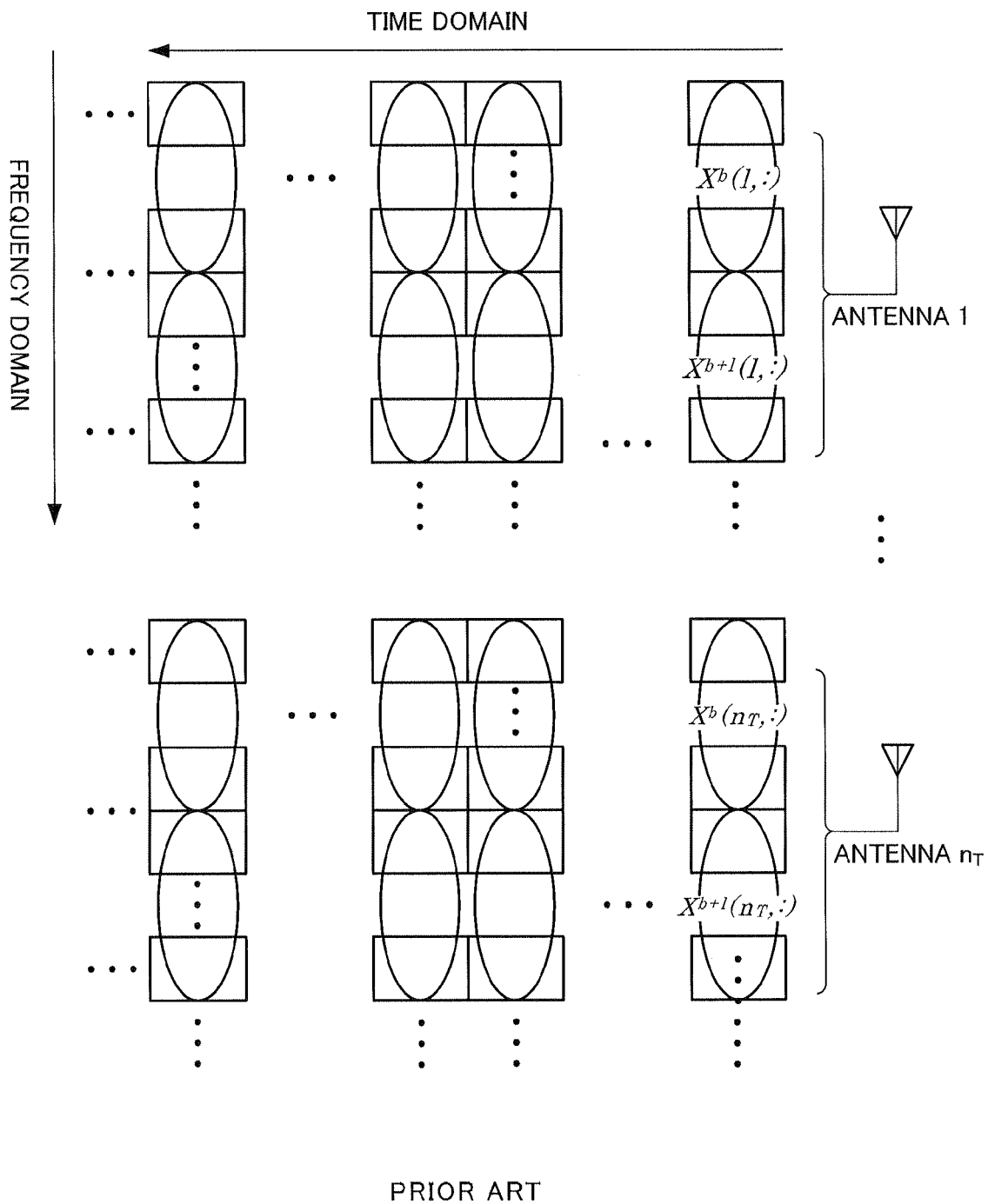
FIG. 3 shows the ST coding method in the MIMO-OFDM system.
Figure 4:
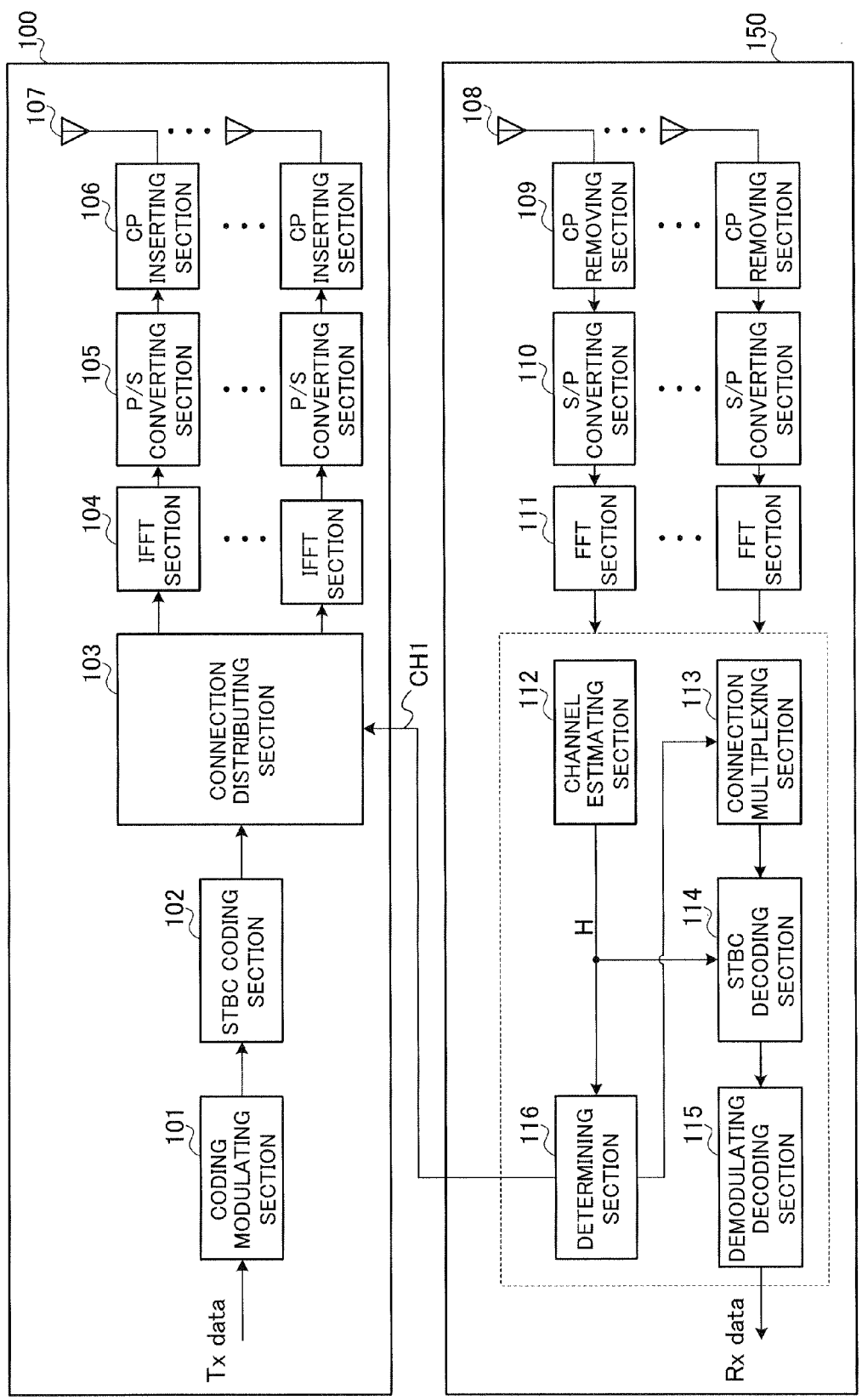
FIG. 4 is a block diagram showing the configuration of a MIMO-OFDM system according to this embodiment of the present invention.

FIG. 4 is a block diagram showing the configuration of a MIMO-OFDM system according to an embodiment of the present invention. This MIMO-OFDM system has multiantenna transmitting apparatus 100 and multiantenna receiving apparatus 150.

Multiantenna transmitting apparatus 100 has coding modulating section 101, STBC coding section 102, distributing section 103, IFFT sections 104, P/S converting sections 105, CP inserting sections 106 and transmitting antennas 107.

On the other hand, multiantenna receiving apparatus 150 has receiving antennas 108, CP removing sections 109, S/P converting sections 110, FFT sections 111, channel estimating section 112, multiplexing section 113, STBC decoding section 114, demodulating decoding section 115 and determining section 116.

IFFT sections 104 to CP inserting sections 106 are provided to equal the number of $n_T$ transmitting antennas 107 of $n_T$-systems and CP removing sections 109 to FFT sections 111 are provided to equal the number of $n_R$ receiving antennas 108 of $n_R$ systems.

First, multiantenna transmitting apparatus 100 will be explained.

Coding modulating section 101 performs coding error correction on data (Tx data) to be transmitted. Further, coding modulating section 101 performs modulation processing such as BPSK, QPSK and 16 QAM and outputs the resulting symbol sequence to STBC coding section 102.

STBC coding section 102 STBC encodes the inputted symbol sequence and outputs data expressed with a matrix formed with two-dimensional symbols in the space domain and the time domain, to distributing section 103.

Distributing section 103 distributes the data encoded by STBC coding section 102 in the time domain, space domain and frequency domain (that is, maps the data in the time-space-frequency domain) and outputs the result to IFFT section 104. To be more specific, based on the combination pattern of resource blocks fed back from determining section 116, distributing section 103 maps the data from STBC coding section 102 in the corresponding time domain (OFDM symbol), frequency domain (subcarrier) and space domain (transmitting antenna). The $n_T$ data corresponding to the transmitting antennas are outputted to corresponding IFFT sections 104. For example, the data corresponding to the first transmitting antenna is outputted to IFFT section 104 corresponding to this transmitting antenna.

IFFT section 104 performs inverse fast Fourier transform (IFFT) on the signal mapped to each transmitting antenna at distributing section 103, converts the signal from the frequency domain to the time domain and outputs the resulting time domain signal to P/S converting section 105.

P/S converting section 105 parallel-to-serial (P/S) converts the signal after inverse fast Fourier transform and outputs the resulting serial signal to CP inserting section 106.

CP inserting section 106 inserts a CP by inserting a copy of the P/S-converted signal foot into the signal head and transmits the signal after CP insertion from antenna 107.

Next, the multiantenna receiving apparatus will be explained.

CP removing section 109 removes the CP inserted in each signal received at receiving antenna 108 and outputs each signal after CP removal to S/P converting section 110.

S/P converting section 110 serial-to-parallel (S/P) converts the signal from which the CP is removed and outputs the resulting signal to FFT section 111.

FFT section 111 fast-Fourier-transforms (FFT) to the S/P-converted signal, converts the signal from the time domain to the frequency domain and outputs the resulting frequency domain signal to channel estimating section 112.

Channel estimating section 112 estimates channel transfer function matrix H indicating the current channel characteristics based on the pilot signal included in the received signal and outputs the estimation result to determining section 116. The channel estimation may be performed using other methods.

Multiplexing section 113 extracts signals corresponding to the same STBC code from the signals mapped to the time-space-frequency domain from FFT section 111, based on the combination pattern provided from determining section 116, collectively forms these signals into a data block and outputs the result to STBC decoding section 114.

STBC decoding section 114 STBC decodes the data block formed at multiplexing section 113 using matrix H obtained at channel estimating section 112 and outputs the resulting data block to demodulating decoding section 115.

Demodulating decoding section 115 demodulates the resulting data block using QPSK and the like, performs error correction decoding on the result and obtains original data (Rx data).

Determining section 116 calculates correlation values between STBC channel characteristics of each resource block and determines a combination pattern of the greatest correlation based on the calculated correlation values. Determining section 116 provides the determined combination pattern to multiplexing section 113 and feeds back the determined combination pattern to distributing section 103 of multiantenna transmitting apparatus 100 through feedback channel CH1 of the MIMO-OFDM system according to this embodiment.

Figure 5:
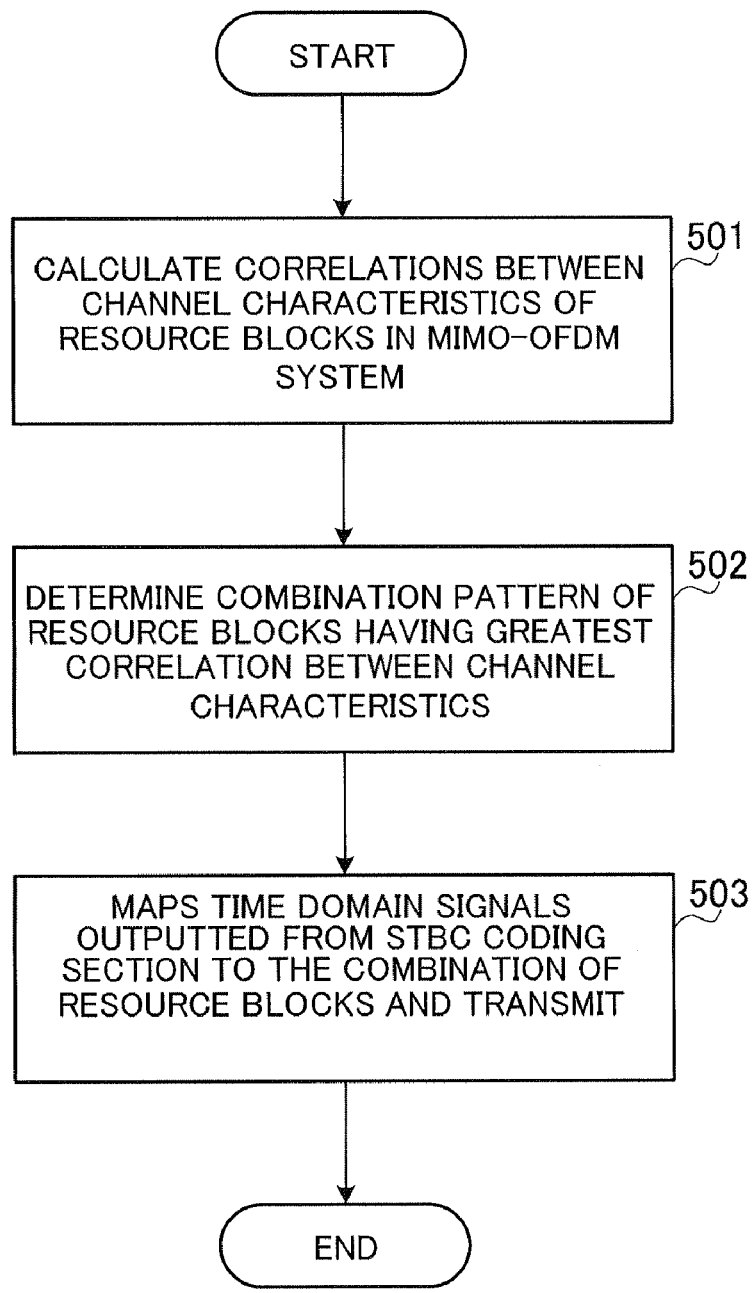
FIG. 5 is a flowchart of a space-time-frequency coding method according to this embodiment.
Figure 6:
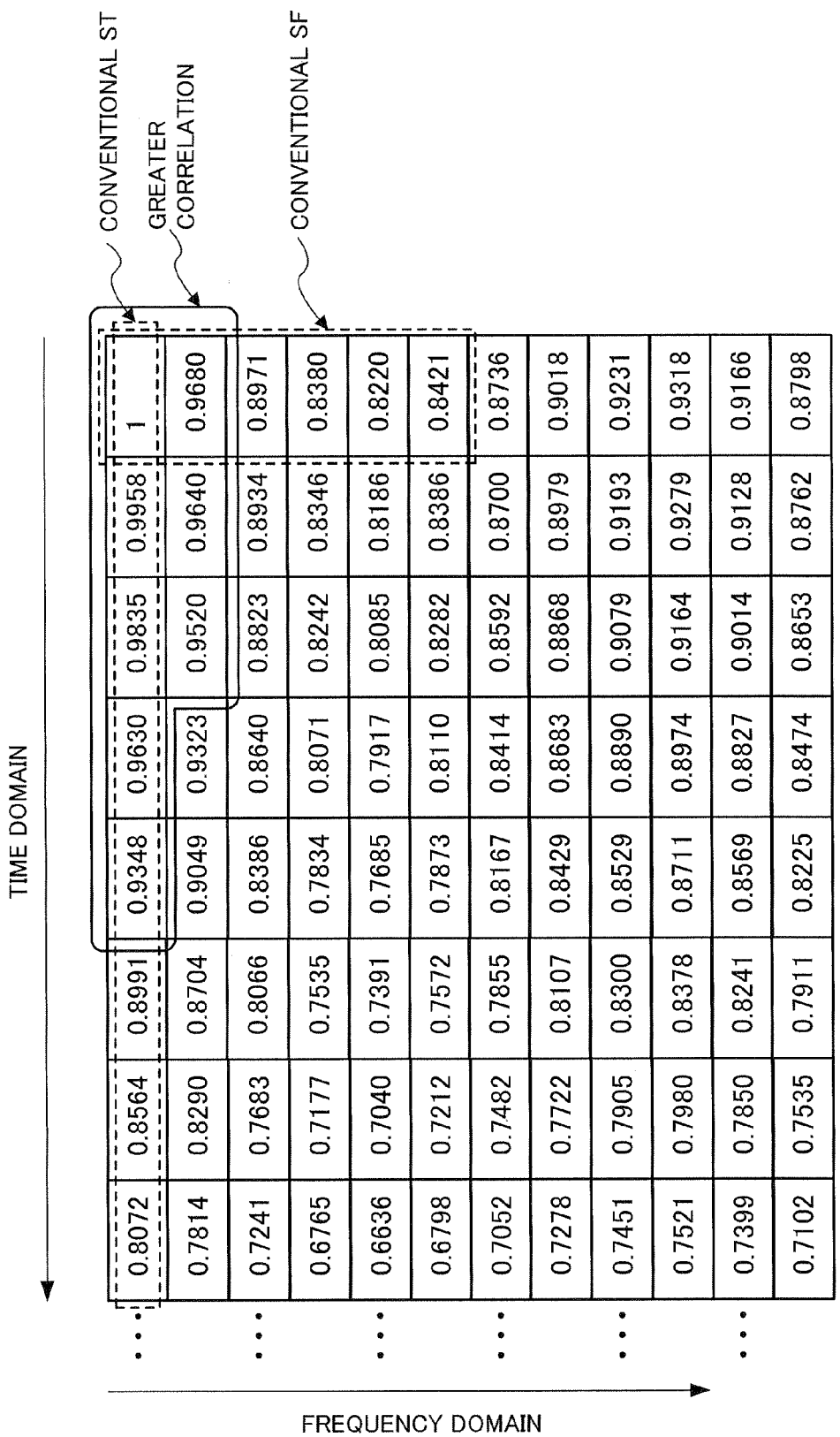
FIG. 6 is a table showing correlation values of the channel characteristics of each resource block in the frequency domain according to this embodiment.
Figure 7:
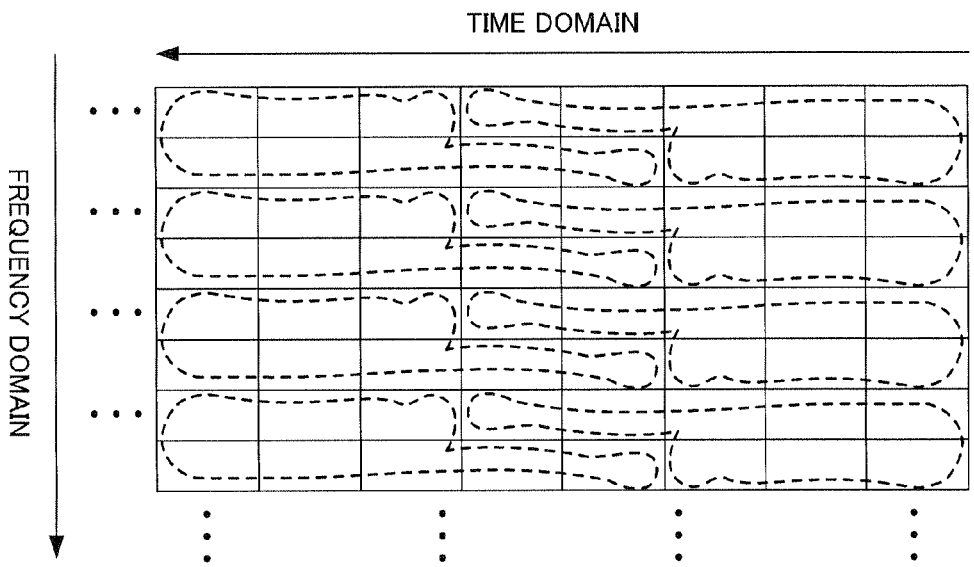
FIG. 7 shows an example of resource block combination in the two-dimensional space of the time-frequency domain according to this embodiment.

The time-space-frequency coding method in the MIMO-OFDM system according to this embodiment will be explained in detail using FIGS. 5 to 7. FIG. 5 is a flowchart of the coding method. FIG. 6 shows an example of correlation data of channel characteristics of each resource block in the frequency domain. FIG. 7 shows a combination of resource blocks in the two-dimensional space of the time-frequency domain according to this embodiment.

When processing in determining section 116 starts, correlations between channel characteristics of the respective resource blocks in the frequency domain in the MIMO-OFDM system are calculated first (S501). The correlation is calculated using the algorithm represented by following equation 4.

[4]

$$r_H[n,k] = r_t(nT)\left(\sum_l \sigma_l^2 e^{-j2\pi k \Delta f \tau_l}\right) \quad \text{(Equation 4)}$$

Here, $r_H[n,k]$ is a correlation value between channel characteristics of resource blocks in the frequency domain when there is a difference of n OFDM symbols (the time length of each OFDM symbol is T) in the time domain and a difference of k subcarriers in the frequency domain. Δf is the bandwidth of each subcarrier in OFDM, and $\sigma_1^2$ and $\tau_1$ are the unit time power and the delay of the first path, respectively, in a multipath channel model. In above equation 4, $r_t$ (nT) is $J_0$ (2πnTf$_d$), $J_0$ (x) is the Bessel function of first kind of order zero and $f_d$ is a maximum Doppler frequency shift. Generally, the correlation value resulting from above equation 4 is a complex number and the real part is used as a numerical value indicating the finally obtained correlation.

Furthermore, the correlation between channel characteristics is based on statistical data obtained in a long time, and does not vary in a short time. When the speed of a mobile station or communication environment (for example, indoors and outdoors or an urban area, suburban area and mountain zone) changes, the correlation between channel characteristics change. Therefore, correlation may be calculated at regular time intervals. A specific time interval may be set in advance according to the environment in which the system is actually used.

Furthermore, upon calculating correlations between channel characteristics, instead of calculating correlation values of all combinations of two arbitrary resource blocks, only correlation values between channel characteristics of one fixed resource block (which may be determined in advance) and other resource blocks may be calculated, so that, for example, in FIG. 6, only a correlation value between each resource block and the top right resource block is calculated. As is clear from the above algorithm for the correlation, the correlation value depends on the values of n and k alone, has nothing to do with specific positions and is determined by the intervals of two resource blocks in the time domain and the frequency domain alone.

Next, a resource block combination pattern having the greatest correlation is determined (S502).

Mapping positions where time domain signals of all coded signals outputted from STBC coding section 102 are mapped in the two-dimensional space of the time-frequency domain of the MIMO-OFDM system, are determined, that is, to which combination of resource blocks the signals are mapped to transmit the signals, is determined. Step 502 includes the following two sub steps (1) and (2).

(1) One combination of resource blocks having the greatest correlation between channel characteristics is determined.

For example, the channel characteristics are the ITU M.1225 channel model B, channel bandwidth B is 10 MHz, the total number of subcarriers Nc is 1024 and maximum Doppler frequency shift $f_d$ is 200 Hz. In this way, a correlation value table such as shown in FIG. 6 is obtained through correlation value calculation in step 501. Furthermore, assuming that the total number of MIMO transmitting antennas is 4, OSTBC coding where R is ½ (that is, L is 8) is used. The processing in this sub step selects L resource blocks having the greatest correlation between channel characteristics of resource blocks from the correlation value table in FIG. 6 as the optimum combination. That is, compared to other combinations, the minimum value of the correlation values between the channel characteristics of the L resource blocks in the selected combination is a maximum. As shown in FIG. 6, the L resource blocks encircled by the solid line is the optimum combination of resource blocks that satisfies the above condition.

(2) Other combination patterns of resource blocks are determined.

In above sub step (1), the optimum combination pattern of resource blocks including the L resource blocks is determined, and so other combination patterns of resource blocks may be determined using the correlation of channel characteristics. As described above, the correlation between channel characteristics of resource blocks is determined based on the values of n and k alone, that is, the correlation has nothing to do with specific positions and depends only on the interval between two resource blocks in the time domain and in the frequency domain. For example, in the example of sub step (1), the optimum combination of the resource blocks shown in FIG. 6 includes five adjoining resource blocks of the same subcarrier in the time domain and three adjoining resource blocks of the neighboring subcarrier in the time domain. Based on the characteristics of the correlation, the optimum combination pattern of resource blocks in the entire time-frequency domain of the two-dimensional space is obtained.

In FIG. 6, one cell is a resource block, the horizontal axis is the time domain and the vertical axis is the frequency domain. The numerical value in each cell is the value of a channel characteristic correlation between a given resource block and a top right resource block. This correlation value is statistical data of the channel characteristic correlation, from which the proximity between channel characteristics can be evaluated. That is, when the correlation value is greater, the channel characteristics of two resource blocks have more proximity.

As shown in FIG. 6, when L is 8, none of conventional coding methods based on ST code, that is, the method of mapping time domain signals of STBC encoded signals, to L adjoining resource blocks in the time domain, and the conventional coding method based on SF code, that is, the method of mapping time domain signals of STBC encoded signals, to L adjoining resource blocks in the frequency domain, can maximize the proximity between channel characteristics of L resource blocks. As shown in FIG. 6, when comparing the correlation between channel characteristics of the L resource blocks mapped using conventional ST code, or the correlation between channel characteristics of the L resource blocks mapped using conventional SF code, the correlation between channel characteristics of L resource blocks inside the solid line frame is greater.

Therefore, in the MIMO-OFDM system, based on the current channel characteristics by optimizing the mapping positions of the time domain signals of STBC encoded signals in the time-frequency domain of the MIMO-OFDM system, mapping the time domain signals of coded signals to the L resource blocks having the greatest correlation in channel characteristics and transmitting the signals, it is possible to suppress interference due to variations in channel characteristics, thereby effectively improving orthogonality between STBC's and increasing the transmission rate and the amount of throughput. Furthermore, when correlations between channel characteristics of resource blocks in the time-frequency domain of the MIMO-OFDM system change due to variations in the environment in which the system is used, the above optimization is a slow process of adaptation, so that the system can adaptively adjust the mapping positions of STBC encoded signals in the time-frequency domain.

Here, although the combination pattern of resource blocks shown in FIG. 7 is not the only pattern in the two-dimensional space of the time-frequency domain, all combinations of resource blocks have common characteristics. That is, each combination includes five adjoining resource blocks of the same subcarrier in the time domain and three adjoining resource blocks of the neighboring subcarrier in the time domain.

Finally, the time domain signals outputted from STBC coding section 102 are mapped to the combinations of resource blocks and transmitted (S503).

The combination pattern of resource blocks determined in step S502 is fed back to distributing section 103 through feedback channel CH1 of the system and used for actual transmission. Distributing section 103 performs distribution processing on the encoded signals outputted from STBC coding section 102 based on the fed back combination pattern of resource blocks, that is, maps the time domain signals of STBC encoded signals to the combination of resource blocks, and maps the space domain signals to the space domain. When the mapped signals are transmitted from antenna 107, the processing is completed.

Figure 8:
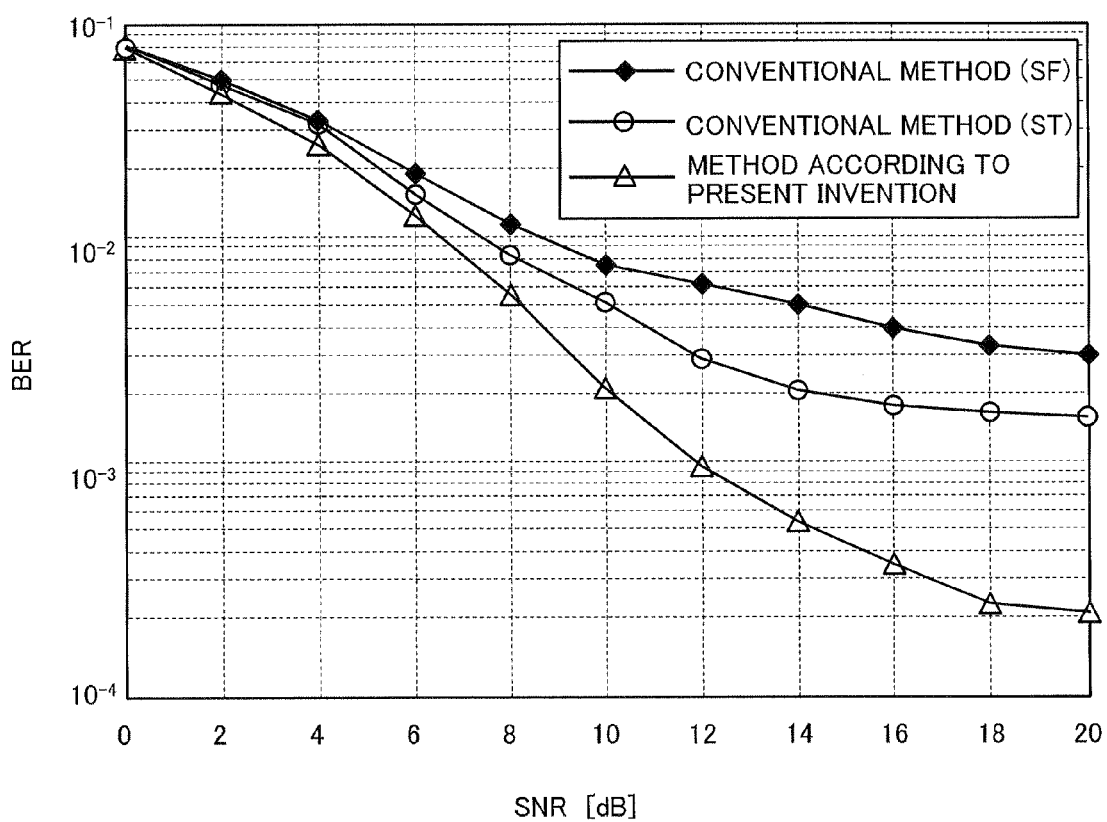
FIG. 8 is a graph comparing the performance of the method of this embodiment with the performance of a conventional method.

FIG. 8 is a graph comparing the performance of the coding method according to this embodiment and performance of the conventional coding methods.

In simulation, the number of transmitting antennas is four and the number of receiving antennas is one. The channel characteristics are the ITU M.1225 channel model B, channel bandwidth B is 10 MHz, total number of subcarriers Nc is 1024, and maximum Doppler frequency shift $f_d$ is 200 Hz. OSTBC coding where R is ½ (that is, L is 8) and QPSK modulation are used. FIG. 8 shows BER performance in cases conventional coding methods based on SF and ST are used and the coding method according to this embodiment is used. As shown in the figure, compared to the conventional coding methods, better BER performance can be obtained in the system using the coding method according to this embodiment.

Although a typical embodiment has been explained above, various other modifications, replacements and additions can be made as far as they do not depart from the spirit and the scope of the present invention. Although a case has been described with this embodiment as an example where the configuration is provided in which the multiantenna transmitting apparatus is separate from the multiantenna receiving apparatus, the multiantenna communication apparatus need not always be provided with both the multiantenna transmitting apparatus and the multiantenna receiving apparatus.

The present application is based on Chinese Patent Application No. 200510073893.3, filed on May 26, 2005, the entire content of which is expressly incorporated by reference herein.

INDUSTRIAL APPLICABILITY

The multiantenna communication apparatus according to the present invention is applicable to a MIMO-OFDM system.

The invention claimed is:

1. A multiantenna communication system comprising:
a determining section that calculates correlation values between channel characteristics of resource blocks in space time block code and determines a combination pattern of a greatest correlation;
a distributing section that maps transmission data encoded using space time block code to a time domain, a space domain and a frequency domain according to the combination pattern determined by the determining section;
a transmitting section that transmits, through a plurality of antennas, signals corresponding respectively to the antennas;
a receiving section that receives, through a plurality of antennas, the signals transmitted by the transmitting section; and
a multiplexing section that extracts signals corresponding to a same space time block code from the signals mapped to the time domain, the space domain and the frequency domain, according to the combination pattern determined by the determining section and forms a data block.

2. A multiantenna transmitting apparatus used for the multiantenna communication system according to claim 1, the apparatus comprising:
a space time block coding section that space time block codes transmission data;
a distributing section that maps signals encoded using space time block code to a time domain, a space domain and a frequency domain according to the combination pattern determined by the determining section; and
a transmitting section that transmits, through a plurality of antennas, signals corresponding to the antennas.

3. A multiantenna receiving apparatus used for the multiantenna communication system according to claim 1, the apparatus comprising:
a determining section that calculates correlations between channel characteristics of resource blocks in space time block code and determines a combination pattern of a greatest correlation;
a receiving section that receives, through a plurality of antennas, signals transmitted by a transmitting section;
a multiplexing section that extracts signals corresponding to a same STBC from signals mapped to the time domain, space domain and frequency domain, according to the combination pattern determined by the determining section and forms a data block; and
a decoding section that decodes a space time block code block formed by the multiplexing section based on channel characteristics estimated by a channel estimating section.

4. The multiantenna transmitting apparatus according to claim 2, wherein the space time block code coding section performs orthogonal space time block code coding.

5. The multiantenna transmitting apparatus according to claim 2, wherein in the time domain, the space domain and the frequency domain, time domain signals, space domain signals and frequency domain signals in the combination of the respective resource blocks determined by the determining section are transmitted using multiple slots, multiple antennas and multiple frequencies, respectively.

6. The multiantenna receiving apparatus according to claim 3, wherein the determining section determines a time interval in advance and calculates the correlations per predetermined time.

7. The multiantenna receiving apparatus according to claim 3, wherein the determining section determines a combination pattern having the greatest correlation such that the correlation between channel characteristics of resource blocks in a same combination of the resource blocks becomes the greatest.

8. A coding method in a multi-input multi-output-orthogonal frequency division multiplexing system, the method comprising:

calculating correlations between channel characteristics of resource blocks in space time block code and determining a combination pattern of a greatest correlation;

encoding transmission data using space time block code;

mapping signals encoding using space time block code to a time domain, a space domain and a frequency domain according to the determined combination pattern;

transmitting, through a plurality of antennas, signals corresponding respectively to the antennas;

receiving, through a plurality of antennas, the transmitted signals;

extracting signals corresponding to a same space time block code from the signals mapped to the time domain, the space domain and the frequency domain, according to the determined combination pattern and forming a data block; and decoding a space time block code coding block formed by the multiplexing section based on estimated channel characteristics.

* * * * *

UNITED STATES PATENT AND TRADEMARK OFFICE
CERTIFICATE OF CORRECTION

PATENT NO.        : 7,848,445 B2
APPLICATION NO.   : 11/915377
DATED             : December 7, 2010
INVENTOR(S)       : Xiaoming She et al.

It is certified that error appears in the above-identified patent and that said Letters Patent is hereby corrected as shown below:

On the Title Page
Item (22), line 1, incorrectly reads:
"(22) PCT Filed: May 26, 2006"
and should read:
"(22) PCT Filed: May 25, 2006"

Signed and Sealed this
Fourteenth Day of February, 2012

David J. Kappos
*Director of the United States Patent and Trademark Office*